US007194857B2

(12) United States Patent
Hung

(10) Patent No.: US 7,194,857 B2
(45) Date of Patent: Mar. 27, 2007

(54) VENTILATION VALVE OF HYDRAULIC JACK

(75) Inventor: Victor Hung, Lu Chu Hsiang (TW)

(73) Assignee: Shinn Fu Corporation, Tao Yuan County (TW)

( * ) Notice: Subject to any disclaimer, the term of this patent is extended or adjusted under 35 U.S.C. 154(b) by 944 days.

(21) Appl. No.: 10/377,796

(22) Filed: Mar. 4, 2003

(65) Prior Publication Data

US 2004/0172938 A1 Sep. 9, 2004

(51) Int. Cl.
*F15B 1/26* (2006.01)
*F16K 17/28* (2006.01)

(52) U.S. Cl. ...................................... 60/478; 137/519.5

(58) Field of Classification Search .................. 60/477, 60/478; 137/519.5

See application file for complete search history.

(56) References Cited

U.S. PATENT DOCUMENTS 1,656,430 A * 1/1928 Dybens ....................... 60/478
3,113,587 A * 12/1963 Hendley .................. 137/519.5
4,945,947 A * 8/1990 Westra et al. ............ 137/519.5
5,465,576 A * 11/1995 Miller ......................... 60/478
6,439,506 B1 * 8/2002 Schlegel et al. ......... 137/519.5

* cited by examiner

*Primary Examiner*—Thomas E. Lazo
(74) *Attorney, Agent, or Firm*—Bacon & Thomas, PLLC

(57) ABSTRACT

A ventilation valve of a hydraulic jack is dedicated to be mounted at an outer wall of an oil storage tank of a hydraulic jack. The hydraulic jack includes a valve seat, a valve ball, and a cap. When the jack is not operated, a valve hole is opened; the vent of the cap is communicated with the oil storage tank of the jack so as to maintain the equilibrium of the pressure of the oil storage tank; thereby the piston of the pump can suck oil successfully so that the oil is absorbed into the oil chamber of the pump to be saturated therein. At the moment that the valve ball ejects upwards rapidly, the oil buffer chamber can buffer high pressure draining oil until the oil return operation of the jack is accomplished.

10 Claims, 5 Drawing Sheets

VENTILATION VALVE OF HYDRAULIC JACK

BACKGROUND OF THE INVENTION (a) Field of the Invention

The present invention relates to ventilation valves, and particularly to a ventilation valve of a hydraulic jack, wherein when the jack is not operated, a valve hole is opened; the vent of a cap of the jack is communicated with the oil storage tank of the jack so as to maintain the equilibrium of the pressure of the oil storage tank; thereby the piston of the pump can suck oil successfully so that the oil is absorbed into the oil chamber of the pump to be saturated therein.

(b) Description of the Prior Art

In the lifting process of a prior art jack, a piston of a pump absorbs oil from an oil storage tank into an oil chamber of a pump. Then oil is transferred into an inner oil tank. By the reciprocal operation of above process, the jack can lift upwards gradually. In the prior art design, the oil storage tank of a hydraulic jack is sealed completely. When the pump operates initially, the oil in the oil storage tank passes through the oil chamber of the pump and enters into the inner oil tank. The oil storage will reduce gradually. The less the oil storage, the smaller the pressure of the oil storage tank. As a result, the pressure will approach to a vacuum pressure. Thereby, the pumping operation becomes difficult so that the piston can absorb oil successfully. Moreover, the oil absorption cannot be in an optimum saturation condition. Thus, in each lifting process, a maximum efficiency can not be achieved.

SUMMARY OF THE INVENTION

Accordingly, the primary object of the present invention is to provide a ventilation valve of a hydraulic jack dedicated to be mounted at an outer wall of an oil storage tank of a hydraulic jack. The hydraulic jack includes a valve seat, a valve ball, and a cap.

Another object of the present invention is to provide a ventilation valve of a hydraulic jack, wherein when the jack is not operated, a valve hole is opened; the vent of a cap is communicated with the oil storage tank of the jack so as to maintain the equilibrium of the pressure of the oil storage tank; thereby the piston of the pump can suck oil successfully so that the oil is absorbed into the oil chamber of the pump to be saturated therein.

A further object of the present invention is to provide a ventilation valve of a hydraulic jack, wherein when the oil of the jack flows along a return path in the oil buffer chamber between the valve seat and the cap, the valve ball will close the valve hole of the valve body by the upward ejection of the valve ball since a large amount oil in the oil groove returns to the oil storage tank rapidly in a high pressure so as to prevent the oil from flushing out.

Another object of the present invention is to provide a ventilation valve of a hydraulic jack, wherein at the moment that the valve ball ejects upwards rapidly, an oil buffer chamber can buffer high pressure draining oil until the oil return operation of the jack is accomplished after wholly descents. Since the pressure of the oil storage tank is reduced, the valve ball will fall down due to the gravitational effect so as to open the valve hole and as a result, the surplus gas is released. Thereby, the pressure of the oil storage tank of the jack is in equilibrium state with the atmosphere.

The various objects and advantages of the present invention will be more readily understood from the following detailed description when read in conjunction with the appended drawing.

DETAILED DESCRIPTION OF THE PREFERRED EMBODIMENTS

Figure 1:
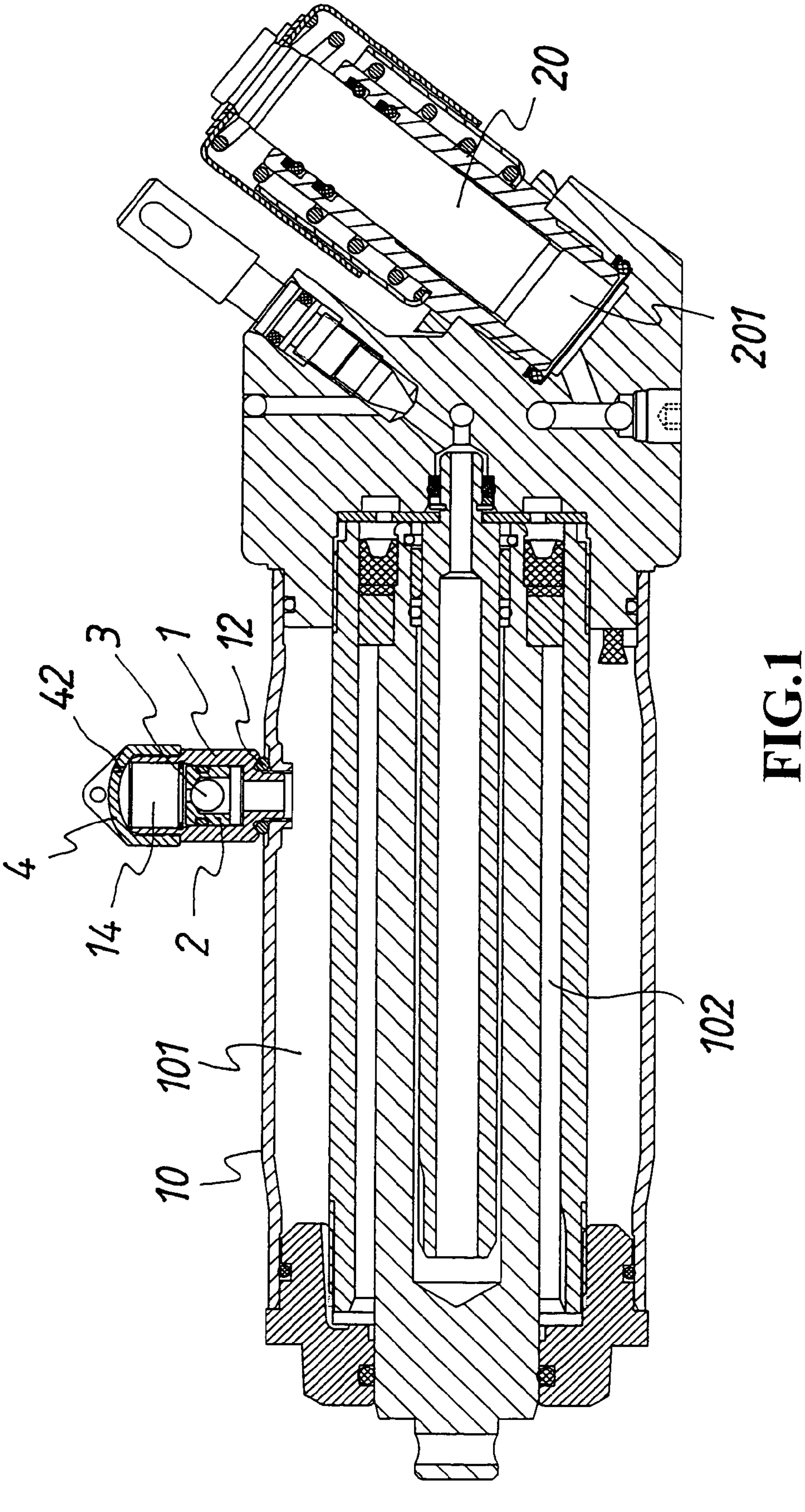
FIG. 1 is an assembled schematic view of the jack installed in the present invention.
Figure 2:
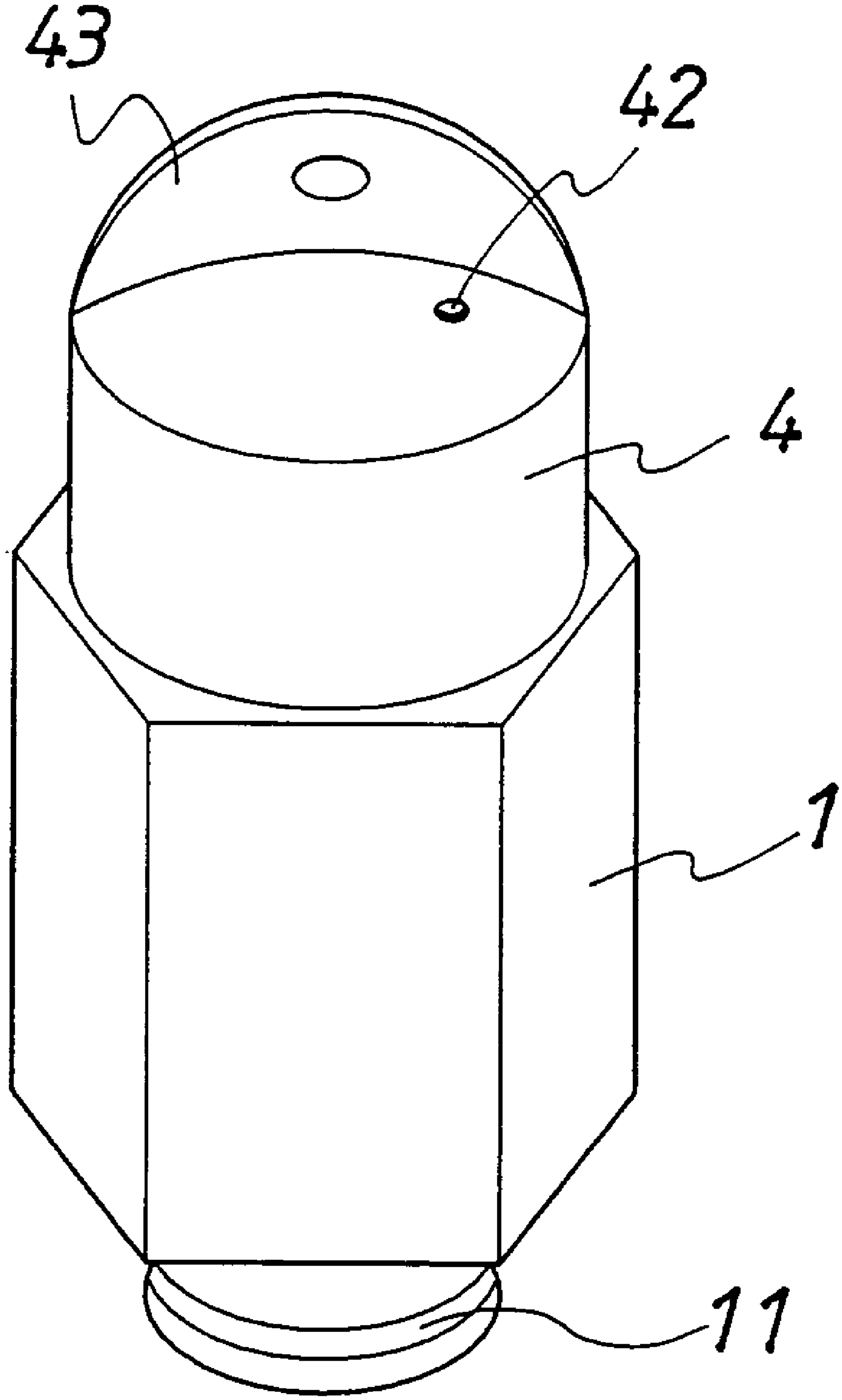
FIG. 2 is an assembled perspective view of the present invention.
Figure 3:
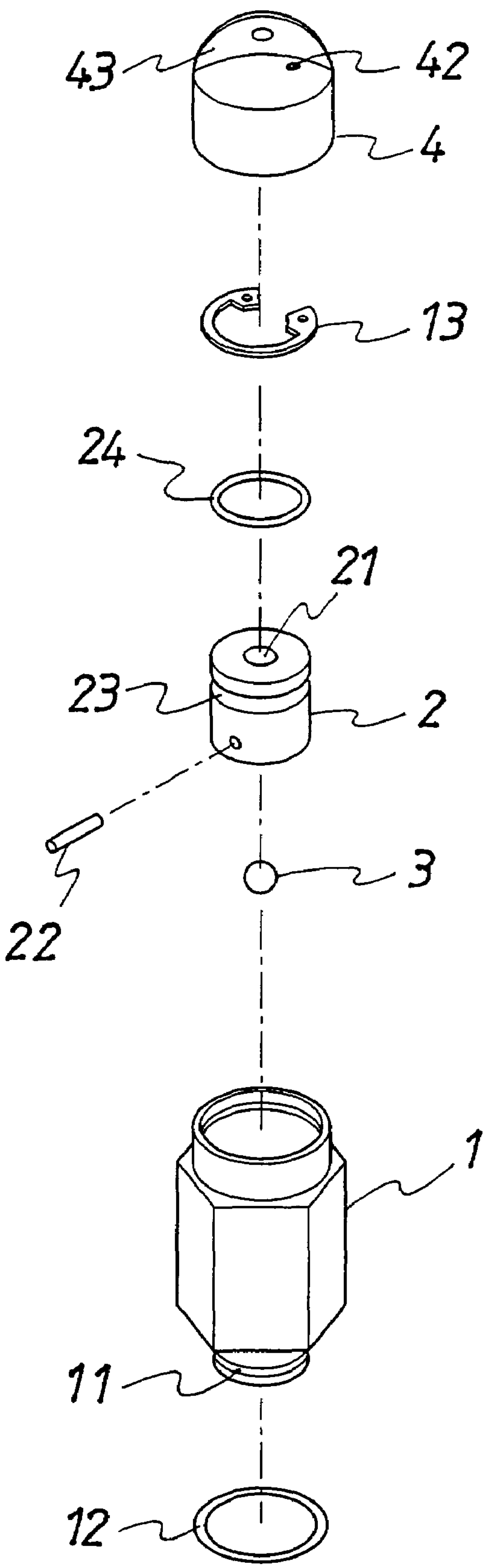
FIG. 3 is an exploded perspective view of the present invention.

Referring to FIGS. 1 and 3, the ventilation valve of a hydraulic jack of the present invention is illustrated. The ventilation valve of a hydraulic jack is dedicated to be used at an outer wall of an oil storage tank 101 of a hydraulic jack 10. The hydraulic jack 10 includes a valve seat 1, a valve ball 3, a cap 4, etc.

The valve seat 21 is a hollow seat and one end thereof has a threaded section 11, which is locked to an outer wall of an oil storage tank 101 of a hydraulic jack 10 and is communicated to the oil storage tank 101. An O ring 12 serves to seal the connection portion of the valve seat 1 and the oil storage tank 101. An interior of the valve seat 1 can receive a valve body 2. An upper end of the valve body 2 is installed with a buckling ring 13. An upper section of the valve seat 1 is extended with an oil buffer chamber 14 for storing oil temporarily.

The valve body 2 is a hollow body and is received in the valve seat 1. An upper end of the valve body 2 is formed with a valve hole 21 having a valve ball 3 therein. A lower end of the valve body 2 is formed with a stopping pin 22 or a proper stopper for hindering the valve ball 3 to fall out. An outer wall of the valve body 2 has an annular groove 23 for embedding an oil seal 24.

Figure 4:
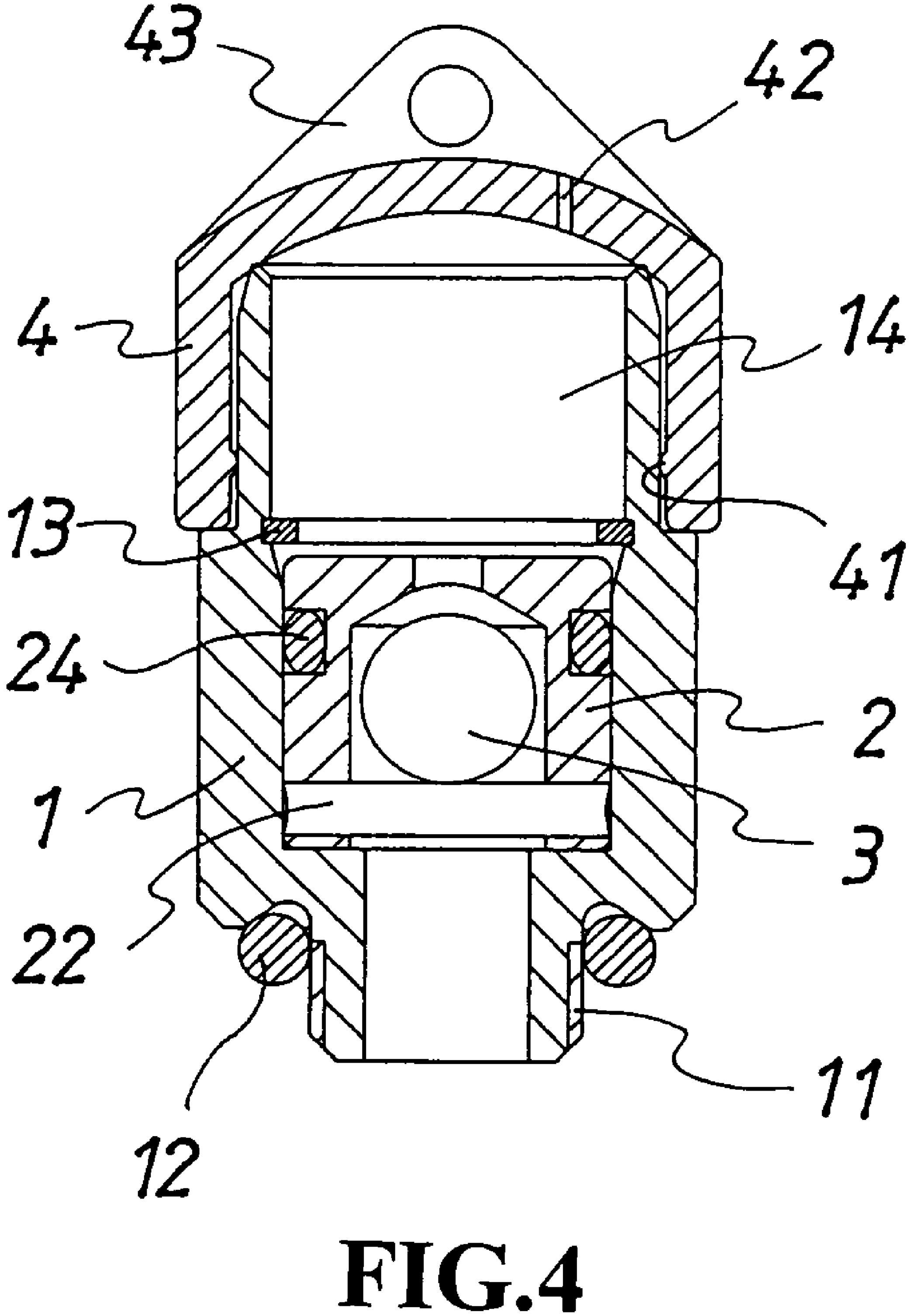
FIG. 4 is an assembled cross section view showing the valve hole of the present invention being opened.
Figure 6:
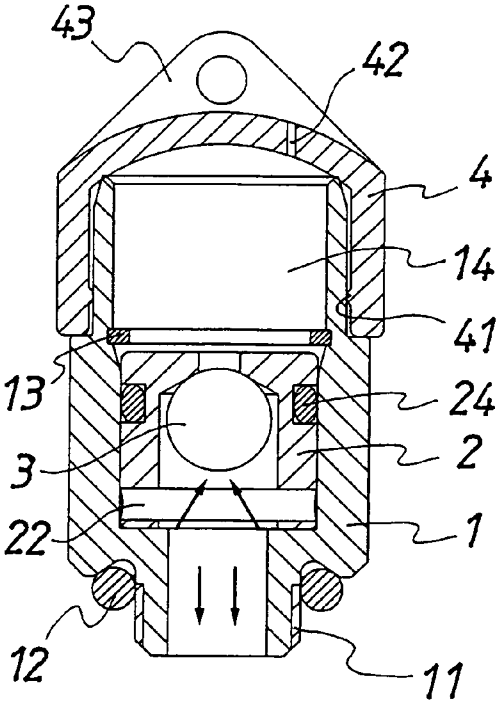
FIG. 6 is a schematic view showing that the valve hole of the present invention is closed due to the ejection of oil.
Figure 5:
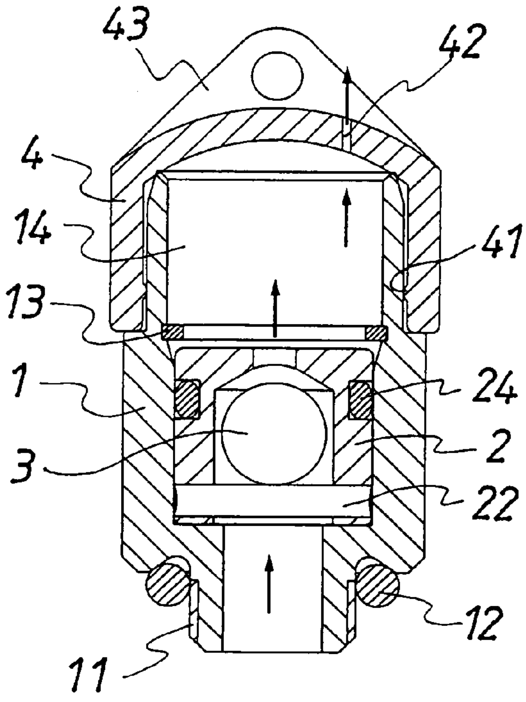
FIG. 5 is a schematic view showing a transient state in that the valve ball is ejected by oil according to the present invention.

The valve ball 3 is installed within the valve body 2. By the raising and descending of the valve body 2, the valve hole 21 of the valve body 2 is controlled to be closed (referring to FIG. 6) or to be opened (referring to FIG. 4).

The cap 4 can be made of flexible plastic and an inner wall of the cap 4 has an annular rib 41 (referring to FIG. 4), thereby, the cap 4 can be combined with another end of the valve seat 2. A vent 42 communicated with outer space is formed at a predetermined position of the cap 4. An upper end of the cap is formed with a protruded piece 43 for holding the cap.

The ventilation valve made of above components will be installed to the outer wall of the oil storage tank 101 of the hydraulic jack 10. When the hydraulic jack 10 is not operated, the valve ball 3 of the ventilation valve will fall down due to gravitational effect (referring to FIG. 4), the valve hole 21 will be opened. Then the vent 42 of the cap 4 will be communicated with the oil storage tank 101 of the jack 10. The pressure in the oil storage tank 101 is in equilibrium with the atmosphere. Then the atmosphere is larger than the pressure of the oil chamber in the pump. By this pressure difference, the piston 20 of the pump will absorb oil successfully so that oil is absorbed into the oil chamber 201 of the pump 20 so as to be saturated therein. Thereby, each time the jack 10 is raised, it can be operated with an optimum effect.

When the oil of the jack 10 flows along a return path, in the oil buffer chamber 14 between the valve seat 2 and the cap 4, the valve ball 3 will close the valve hole 21 of the valve body 2 by the upward ejection of the valve ball 3 since a large amount oil in the oil groove 102 returns to the oil storage tank 101 rapidly in a high pressure (referring to FIG. 6) so as to prevent the oil from flushing out. At the moment that the valve ball 3 ejects upwards rapidly, the oil buffer chamber 14 can buffer high pressure draining oil until the oil return operation of the jack 10 is accomplished after wholly descents. Since the pressure of the oil storage tank 101 is reduced, the valve ball 3 will fall down due to the gravitational effect so as to open the valve hole 21 so as to release the surplus gas. Thereby, the pressure of the oil storage tank 101 of the jack 10 is in equilibrium with the atmosphere. Next time as the jack 10 raises, the oil left in the oil buffer chamber 14 will be sucked into the oil storage tank 101 by the vacuum effect of the chamber.

The present invention is thus described. It will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A ventilation valve of a hydraulic jack dedicated to be mounted at an outer wall of an oil storage tank of a hydraulic jack; the hydraulic jack including a valve seat, a valve ball, a cap; characterized in that:

the valve seat is a hollow seat; the valve seat is locked to an outer wall of an oil storage tank of a hydraulic jack and is communicated to the oil storage tank; the valve body is received in the valve seat;

the valve body is a hollow body and is received in the valve seat; an upper end of the valve body is formed with a valve hole having a valve ball therein; a lower end of the valve body is formed with a stopper for hindering the valve ball to fall out;

the valve ball is installed within the valve body; by the raising and descending of the valve body, the valve hole of the valve body is controlled to be closed or to be opened;

the cap is tightly combined with another end of the valve seat;

a vent communicated with outer space is formed at a predetermined position of the cap;

wherein in above mentioned ventilation valve, when the jack is not operated, the valve hole is opened; the vent of the cap is communicated with the oil storage tank of the jack so as to maintain the equilibrium of the pressure of the oil storage tank; thereby the piston of the pump can suck oil successfully so that the oil is absorbed into the oil chamber of the pump to be saturated therein.

2. The ventilation valve of a hydraulic jack as claimed as 1, wherein one end of the valve seat locked to the outer wall of the oil storage tank of the jack has a threaded section.

3. The ventilation valve of a hydraulic jack as claimed as 1, wherein an O ring serves to seal the connection portion of the valve seat and the oil storage tank.

4. The ventilation valve of a hydraulic jack as claimed as 1, wherein an upper end of the valve body is installed with a buckling ring.

5. The ventilation valve of a hydraulic jack as claimed as 1, wherein an upper section of the valve seat is extended with an oil buffer chamber for storing oil temporary.

6. The ventilation valve of a hydraulic jack as claimed as 1, wherein the stopper at the lower end of the valve body is a stopping pin.

7. The ventilation valve of a hydraulic jack as claimed as 1, wherein an outer wall of the valve body has an annular groove for embedding an oil seal.

8. The ventilation valve of a hydraulic jack as claimed as 1, wherein an inner wall of the cap has an annular rib.

9. The ventilation valve of a hydraulic jack as claimed as 1, wherein an upper end of the cap is formed with a protruded piece for holding the cap.

10. The ventilation valve of a hydraulic jack as claimed as 1, wherein the cap is made of flexible plastic material.

* * * * *